Figure 1:
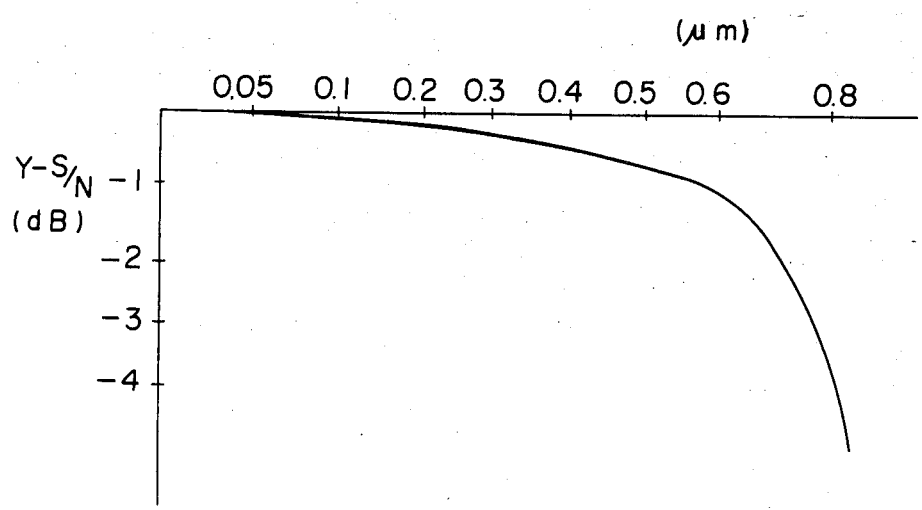

United States Patent [19]

Nishimatsu et al.

[11] Patent Number: 4,628,009
[45] Date of Patent: Dec. 9, 1986

[54] MAGNETIC RECORDING MEDIUM

[75] Inventors: Masaharu Nishimatsu; Toshiaki Ide; Yoshiaki Saito; Yuichi Kubota, all of Tokyo, Japan

[73] Assignee: TDK Corporation, Tokyo, Japan

[21] Appl. No.: 796,526

[22] Filed: Nov. 12, 1985

Related U.S. Application Data

[63] Continuation of Ser. No. 627,608, Jul. 3, 1984, abandoned.

[30] Foreign Application Priority Data

Jul. 26, 1983 [JP] Japan .................... 58-135127

[51] Int. Cl.⁴ ............................................. G11B 5/72
[52] U.S. Cl. ................................... 428/694; 360/134; 360/135; 360/136; 427/128; 427/131; 427/132; 428/695; 428/900; 428/522
[58] Field of Search ............ 428/694, 695, 900, 425.9, 428/522; 427/128, 131, 132; 360/134–136

[56] References Cited

U.S. PATENT DOCUMENTS

| 4,328,935 | 5/1982 | Steel | 428/694 |
| 4,429,010 | 1/1984 | Shibata | 428/900 |
| 4,443,514 | 4/1984 | Yamamoto | 428/694 |
| 4,452,863 | 6/1984 | Takizawa | 428/694 |
| 4,547,419 | 10/1985 | Nishimatsu | 428/328 |
| 4,567,083 | 1/1986 | Arioku | 428/329 |

*Primary Examiner*—Ellis P. Robinson
*Attorney, Agent, or Firm*—Oblon, Fisher, Spivak, McClelland & Maier

[57] ABSTRACT

A magnetic recording medium which comprises a plastic base film, a thin magnetic metal layer formed on one side of the base film and a thermoset backing layer formed on the other side of the base film, wherein the backing layer is made of a thermosetting composition comprising a vinyl chloride-vinyl acetate-vinyl alcohol copolymer, a polyurethane prepolymer and a polyisocyanate and has a surface roughness of from 0.05 to 0.6 µm.

4 Claims, 1 Drawing Figure

MAGNETIC RECORDING MEDIUM

This application is a continuation of application Ser. No. 627,608, filed July 3, 1984, now abandoned.

The present invention relates to a magnetic recording medium. More particularly, the present invention relates to a magnetic recording medium and a process for its production, wherein a backing layer is formed on a thin film-type magnetic recording medium having a thin ferromagnetic metal (inclusive of alloy) layer formed on a substrate of e.g. polyester by electroplating, chemical plating, vapour deposition, sputtering, ion plating or the like, to reduce the frictional coefficient and to minimize the curling, whereby the dropout can be minimized.

Recently, magnetic tapes have been widely used in the fields of audio and video recording, computers, etc. The amount of information to be recorded on magnetic recording media increases year after year, and there is an increasing demand for recording media to have a high recording density.

A thin ferromagnetic metal layer formed by electroplating, chemical plating, vacuum deposition, sputtering or ion plating, is composed of 100% metal or alloy, and thus is capable of having a high recording density. However, when a thin ferromagnetic metal layer is formed by such a method, the surface condition of the substrate gives a substantial effect on the surface condition of the thin ferromagnetic layer.

In order to minimize the spacing loss with the magnetic head and thereby to reduce the dropout, the surface of the magnetic layer is desired to be as smooth as possible. In the case of a thin metal layer, the surface property is much improved over the magnetic layer composed of magnetic metal powder dispersed in a binder. However, since the surface roughness is as small as 0.01 $\mu$m (as a $R_{20}$ value, i.e. an average value of 20 measured values, at a cut off of 0.17 mm by the Tallistep method mentioned hereinafter), the contacting surface area is correspondingly large and the frictional coefficient is likewise large, whereby smooth running tends to be difficult. Besides, there is a trend that the thickness of the substrate such as a plastic base film made of e.g. polyethyleneterephthalate, polyethylenenaphthalate, polyimide or polyamide, becomes thinner. At present, a thickness of 11 $\mu$m or less is being studied. As the base film becomes thinner, the medium tends to be so flexible that the friction will increase, the winding up adhesion is likely to take place, and the adhesion to the guide rollers or support pins is likely to occur. Further, the thin magnetic metal layer tends to curl the medium.

Under the circumstances, the present invention is intended to overcome such difficulties of the conventional magnetic recording medium in which a thin magnetic metal layer is employed, and to provide a backing layer which exhibits extremely effective functions.

The present invention is based on a discovery such that even when a thin magnetic metal layer has an extremely smooth surface with a roughness of about 0.01 $\mu$m, it is possible to impart stiffness to the medium, to reduce the friction and to minimize the winding-up adhesion, the cinching phenomenon (the loosening of the tape winding which is likely to take place when the tape running has been stopped abruptly, owing to the adhesion of the tape at the time of the winding-up of the tape) and the curling, by forming a backing layer with a thermosetting composition comprising a vinyl chloride-vinyl acetate-vinyl alcohol copolymer, a polyurethane prepolymer and a polyisocyanate, or such a thermosetting composition to which nitrocellulose is further added, and further by selecting the surface roughness of the backing layer within a range of from 0.05 to 0.6 $\mu$m.

Namely, the present invention provides a magnetic recording medium which comprises a plastic base film, a thin magnetic metal layer formed on one side of the base film and a thermoset backing layer formed on the other side of the base film, wherein the backing layer is made of a thermosetting composition comprising a vinyl chloride-vinyl acetate-vinyl alcohol copolymer, a polyurethane prepolymer and a polyisocyanate and has a surface roughness of from 0.05 to 0.6 $\mu$m.

Now, the present invention will be described in detail with reference to the preferred embodiments.

In the accompanying drawing,

FIG. 1 shows a relationship between the surface roughness of the backing layer and the reproduction output.

When the backing layer is formed with the above-mentioned thermosetting composition, the surface roughness of the backing layer is extremely important since the surface roughness of the thin ferromagnetic metal layer is as small as about 0.01 $\mu$m. It has been found that the surface roughness of the backing layer should be selected within a range of from 0.05 to 0.6 m for the improvement of the S/N ratio and the running characteristics. If the surface roughness exceeds 0.6 $\mu$m, the surface property of the magnetic layer is not effectively utilized, whereby the S/N ratio tends to decrease considerably. On the other hand, if the surface roughness is less than 0.05 $\mu$m, the friction of the backing layer tends to be too great, whereby the running characteristics tend to be poor, and no adequate improvement will be obtained in the prevention of the adhesion.

The proportions of the respective components of the binder to be used for the backing layer may be varied within wide ranges. However, in the case of the resin mixture comprising a vinyl chloride-vinyl acetate-vinyl alcohol copolymer and a polyurethane, it is preferred to use from 10 to 80% by weight of the former and the rest being the latter and add a polyisocyanate in an amount of from 5 to 80 parts by weight relative to 100 parts by weight of the total amount of the above resin mixture.

In the case where nitrocellulose is added to the above binder composition, from 15 to 60% by weight of nitrocellulose, from 15 to 60% by weight of a vinyl chloride-vinyl acetate-vinyl alcohol copolymer and from 10 to 70% by weight of a polyurethane are used to bring the total amount to 100% by weight. A polyisocyanate is added in an amount of from 5 to 80 parts by weight relative to 100 parts by weight of the total amount of the above resin composition. The addition of nitrocellulose serves to further reduce the adhesion and improve the abrasion resistance.

As a filler to be used for the backing layer of the present invention, there may be mentioned (1) a conductive filler such as graphite or carbon black, or (2) an inorganic filler such as $SiO_2$, $TiO_2$, $Al_2O_3$, $Cr_2O_3$, SiC, $CaCO_3$, zinc oxide, geothite, $\alpha$-$Fe_2O_3$, talc, kaolin, $CaSO_4$, boron nitride, teflon powder, fluorinated graphite or molybdenum disufide. These fillers may be used in an amount of from 20 to 200 parts by weight in the case of the filler (1), and from 10 to 300 parts by weight in the case of the filler (2), relative to 100 parts by weight of the binder. If the amount of the filler is too much, the coated layer tends to be brittle, thus leading to an increase of the dropout.

Now, the present invention will be described in further detail with reference to Examples. In this case, the magnetic layer was formed by vapour-depositing an oblique vapour-deposited magnetic layer comprising 80% by weight of cobalt and 20% by weight of nickel on the surface of a polyethyleneterephthalate film in a thickness of about 1500 Å by a vacuum vapour deposition method.

EXAMPLE 1

A backing layer was formed on the rear side of the base film on which the above-mentioned magnetic layer was supported. This backing layer was obtained by thoroughly mixing the following composition:

|  | Parts by weight |
| --- | --- |
| Vinyl chloride-vinyl acetate-vinyl alcohol copolymer (VAGH manufactured by Union Carbide Co.) | 30 |
| Polyurethane prepolymer (Desmocol 22 manufactured by Bayer AG) | 20 |
| CaCO$_3$ (40 μm) | 70 |
| Stearic acid | 5 |
| Myristic myristate | 2 |
| Methyl ethyl ketone/toluene (50/50) | 300 | adding 30 parts by weight polyisocyanate (Desmodule L manufactured by Bayer AG), thoroughly mixing the mixture, applying and drying the mixture to form a layer of 1 μm as the backing layer, followed by calendar processing to finish a backing layer having various surface roughness and then thermosetting the layer at 80° C. for 40 hours.

EXAMPLE 2

A backing layer was formed in the same manner as in Example 1 except that the following resin composition was employed for the backing layer.

|  | Parts by weight |
| --- | --- |
| Vinyl chloride-vinyl acetate-vinyl alcohol copolymer (VAGH) | 30 |
| Nitrocellulose (Nitrocellulose manufactured by Dicell) | 30 |
| Polyurethane prepolymer (Desmodule 22) | 40 |
| Carbon black | 30 |
| Al$_2$O$_3$ powder | 20 |
| Stearic acid | 5 |
| Myristic myristate | 2 |
| Methyl ethyl ketone/toluene (50/50) | 400 |

COMPARATIVE EXAMPLE 1

A comparative tape was prepared in the same manner as in Example 1 except that 25 parts by weight of a polyurethane prepolymer was used instead of VAGH for the backing layer.

The magnetic recording medium obtained in Example 1 was cut into a tape having a width of a video tape. The tape was driven at a speed of 3.8 m/sec by a video recorder, and the recording and reproduction were conducted at a major frequency of 4.5 MHz, whereupon the S/N ratio was obtained. The results are shown in FIG. 1. When the surface roughness of the backing layer exceeds 0.6 μm, the output decreases considerably, and the S/N ratio decreases. On the other hand, when the surface roughness is less than 0.05 μm, the friction of the backing layer tends to be great, whereby smooth running becomes difficult. Other characteristics are shown in the following Table. It was found that when the surface roughness was within the range of from 0.05 to 0.6 μm, no cinching phenomenon was observed, no adhesion occurred and no curling phenomenon was observed. Thus, it was found that the magnetic recording media of the Examples of the present invention have superior overall magnetic and physical characteristics.

The medium of Example 2 was cut into a tape with a width of a video tape, and tested in the same manner, whereby the same results were obtained. The physical characteristics were as shown in the following Table. The medium of this Example showed lower adhesiveness and higher abrasion resistance than the medium of Example 1.

TABLE

|  | Friction coefficient | Cinching Phenomenon | Abrasion | Adhesion | Curling | Surface roughness |
| --- | --- | --- | --- | --- | --- | --- |
| Example 1 | 0.36 | ○ | ⊙ | ○ | ○ | 0.30 |
| Example 2 | 0.32 | ⊙ | ⊙ | ⊙ | ⊙ | 0.20 |
| Comparative Example 1 | 0.65 | X | X | X | Δ | 0.35 |

Note:
⊙: Excellent
○: Good
Δ: Fair
X: No good

The measuring methods employed in the above various tests were as follows.

1. Frictional coefficient

A magnetic tape was put around a polished aluminum cylinder having a diameter of 4 mm at an angle of 180° so that the backing layer is located inside, and permitted to run at a speed of 2 cm/sec, whereby the tension at the dispensing side and the winding-up side was measured, and the frictional coefficient was obtained by calculation.

2. Cinching phenomenon

By means of a commercially available VHS system VTR, a tape was fast forwarded for its entire length, then fast rewound, stopped at a point where 50 m remains, and then again fast rewound to the end. Then, the winding of the tape was visually examined. Good winding where no space was observed in the tape winding, was designated by ○ , and inferior winding where a space was observed in the tape winding, was designated by X.

3. Abrasion of the backing layer

By means of a commercially available VHS system VTR, a tape was permitted to run 100 times at 40° C.

under a relative humidity of 80%, whereupon the stain in the cassette case was examined. The case where a stain was observed, was designated by X, and the case where no stain was observed, was designated by ○.

4. Adhesion of the magnetic layer with the backing layer

A tape was wound up on a VHS reel, and left to stand at 60° C. for 5 days, whereupon the adhesion was visually evaluated. The case where no adhesion was observed, was designated by ○, and the case where adhesion was observed, was designated by X.

5. Curling

A magnetic tape cut into a piece of 50 mm × 50 mm was placed on a flat glass plate and examined. The case where no curling was observed, was designated by ○, and the case where curling was observed, was designated by X.

6. Surface roughness

The surface roughness was obtained by 20 point average method ($R_{20}$) from the chart obtained by means of Talystep (manufactured by Taylor-Hobson Co.). A cut off of 0.17 mm, a needle pressure of 2 mg and a needle of $0.1 \times 2.5$ μm were employed.

We claim:

1. A magnetic recording medium which comprises a plastic base film, a continuous thin film magnetic metal layer formed on one side of the base film and a thermoset backing layer formed on the other side of the base film, wherein the backing layer is made of thermosetting composition consisting essentially of a vinyl chloride-vinyl acetate-vinyl alcohol copolymer, a polyurethane prepolymer and a polyisocyanate and has a surface roughness of from 0.05 to 0.6 μm, whereby curling of the medium induced by the presence of the thin magnetic metal layer is avoided.

2. A magnetic recording medium which comprises a plastic base film, a continuous thin film magnetic metal layer formed on one side of the base film and a thermoset backing layer formed on the other side of the base film, wherein the backing layer is made of a thermosetting composition consisting essentially of a vinyl chloride-vinyl acetate-vinyl alcohol copolymer, a polyurethane prepolymer, nitrocellulose and a polyisocyanate and has a surface roughness of from 0.05 to 0.6 micron, whereby curling of the medium induced by the presence of the thin magnetic metal layer is avoided.

3. The magnetic recording medium according to claim 1, wherein the thermosetting composition is a resin mixture of from 10 to 80% by weight of the vinyl chloride-vinyl acetate-vinyl alcohol copolymer and from 20 to 90% by weight of the polyurethane, and contains the polyisocyanate in an amount of from 5 to 80 parts by weight based on 100 parts by weight of the resin mixture.

4. The magnetic recording medium according to claim 2, wherein the thermosetting composition is a resin mixture of from 15 to 60% by weight of nitrocellulose, from 15 to 60% by weight of the vinyl chloride-vinyl acetate-vinyl alcohol copolymer and from 10 to 70% by weight of the polyurethane, and contains the polyisocyanate in an amount of from 5 to 80 parts by weight based on 100 parts by weight of the resin mixture.

* * * * *